Figure 1:
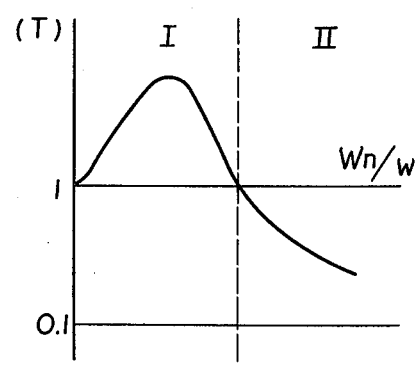

United States Patent [19]

Nakauchi et al.

[11] 4,391,942

[45] Jul. 5, 1983

[54] VIBRATION-INSULATING RUBBER COMPOSITION

[75] Inventors: Hideo Nakauchi, Yokohama; Shingo Kato, Tokyo; Yukio Ando, Yokohama, all of Japan

[73] Assignee: Bridgestone Tire Co., Ltd., Tokyo, Japan

[21] Appl. No.: 366,084

[22] Filed: Apr. 6, 1982

[51] Int. Cl.³ .......................... C08K 3/04; C08K 5/01
[52] U.S. Cl. ........................ 524/526; 252/62; 524/474; 524/484; 525/237
[58] Field of Search .............. 524/526, 484, 474; 525/237; 252/62

[56] References Cited

U.S. PATENT DOCUMENTS

| | | | |
|---|---|---|---|
| 3,454,462 | 7/1969 | Hawley | 524/526 |
| 3,630,974 | 12/1971 | Ladocsi et al. | 525/210 |
| 3,928,259 | 12/1975 | Feniak | 525/237 |
| 3,968,076 | 7/1976 | Gessler et al. | 524/526 |
| 3,985,832 | 10/1976 | Newman | 525/193 |
| 4,014,852 | 3/1977 | Gessler et al. | 524/526 |
| 4,224,196 | 9/1980 | Gursky | 524/526 |
| 4,294,732 | 10/1981 | Ohyachi | 524/271 |

FOREIGN PATENT DOCUMENTS

| | | | |
|---|---|---|---|
| 39990 | 11/1981 | European Pat. Off. | 524/526 |
| 42278 | 12/1981 | European Pat. Off. | 524/526 |

OTHER PUBLICATIONS

Derwent Abst. 06639D/05 (11-1980) J55151039.
Derwent Abst. 42606C/24 (5-1980) J55060539.
Derwent Abst. 57771C/33 (7-1980) J55086827.

*Primary Examiner*—John C. Bleutge
*Assistant Examiner*—Herbert J. Lilling
*Attorney, Agent, or Firm*—Cushman, Darby & Cushman

[57] ABSTRACT

There is disclosed a rubber composition having excellent vibration-insulating properties. The rubber composition comprises 45 to 75 parts by weight of at least one rubber selected from the group consisting of natural rubber, isoprene rubber, butadiene rubber and styrene-butadiene rubber; 40 to 20 parts by weight of halogenated butyl rubber; 5 to 15 parts by weight of copolymer having a styrene content of not less than 50%; 20 to 80 parts by weight of carbon black based on 100 parts by weight of the total of the above rubbers and copolymer; and 3 to 25 parts by weight of aromatic process oil based on 100 parts by weight of the total of the above rubbers and copolymer.

11 Claims, 1 Drawing Figure

VIBRATION-INSULATING RUBBER COMPOSITION

This invention relates to a rubber composition having vibration insulating or absorbing properties.

Vibration transmissibility of a vibration-insulating rubber is used as a substitute property exhibiting the performance of the rubber. Vibration transmissibility T of a one-degree-of-freedom model made of a vibration-insulating rubber is represented by the following formula (1):

$$T = \sqrt{\frac{Kd^2 + (\omega l)^2}{(Kd - m\omega^2)^2 + (\omega l)^2}} \quad (1)$$

wherein $\omega$ is the frequency of a vibrating or driving force, $Kd$ is dynamic modulus, $l$ is a damping coefficient, and $m$ is the weight of a supported member.

The relation between the vibration transmissibility T and the frequency $\omega$ of the vibrating force is shown in a graph of FIG. 1. In this graph, the vibration transmissibility of region I is represented by the following formula (2) through the approximation of the formula (1). Similarly, the vibration transmissibility of region II is represented by the following formula (3).

$$T \approx \frac{Kd}{\omega l} = \frac{1}{l} \quad (2)$$

$$T \approx \frac{Kd}{m\omega^2 - Kd} \quad (3)$$

As is clear from the formula (2), the transmissibility T near a resonance point in the region I is determined linearly by the value of the damping coefficient $l$. Also, the transmissibility T in the region II is determined by the dynamic modulus or dynamic spring constant $Kd$ as is clear from the formula (3).

In the case where the vibration-insulating rubber is used as a mounting member for an automobile engine, the low frequency (10~20 Hz) region, i.e., the region I in FIG. 1, gives rise to a so-called shake phenomenon based on the resonance of the engine and unsprung parts of the automobile. Also, the high frequency (above 75 Hz) region, i.e., the region II in FIG. 1, contributes to the generation of hum or noise in the passenger room of the automobile. Therefore, it is desirable to obtain a resilient rubber for the above application which has a high damping coefficient in the low frequency region and a low ratio of dynamic spring constant $Kd$ to static spring constant $Ks$ ($Kd/Ks$) in the high frequency region II. To achieve this, it has heretofore been proposed to blend halogenated rubber with natural rubber, isoprene rubber and/or butadiene rubber to produce rubber compositions having excellent properties. In fact, such rubber compositions exhibit good vibration-insulating properties at around a room temperature, but the damping coefficient $l$ of these rubber compositions is conspicuously lowered with the increase in temperature, so that their vibration-insulating properties are adversely affected at temperatures of between 40°~80° C. which are a service temperature range of the vibration-insulating rubber under consideration.

With the above deficiencies of the prior art in view, it is an object of the present invention to provide a rubber composition which has excellent vibration-insulating properties throughout a service temperature range.

The present invention aims at providing a vibration-insulating rubber composition which has a high damping coefficient and a low ratio of dynamic and static spring constants at around a room temperature while preventing the lowering of the damping coefficient at elevated temperatures. To achieve this, halogenated butyl rubber is blended with at least one rubber selected from the group consisting of natural rubber, isoprene rubber, butadiene rubber and styrene-butadiene rubber having a styrene content of about 23%. Then, at least one copolymer with not less than 50% styrene content, selected from the group consisting of high-styrene-content resins and high-styrene-content SBRs both having the maximum damping coefficient at temperatures between about 40° C. to about 80° C., is added to the above rubber blend. Then, carbon black and aromatic process oil are added to the resulting blend to produce a rubber composition having the desired vibration-insulating properties.

According to the present invention, there is provided a vibration-insulating rubber composition which comprises 45 to 75 parts by weight of at least one rubber selected from the group consisting of natural rubber, isoprene rubber, butadiene rubber and styrene-butadiene rubber; 40 to 20 parts by weight of halogenated butyl rubber; 5 to 15 parts by weight of copolymer having a styrene content of not less than 50%; 20 to 80 parts by weight of carbon black based on 100 parts by weight of the total of the above rubbers and copolymer; and 3 to 25 parts by weight of aromatic process oil based on 100 parts by weight of the total of the above rubbers and copolymer.

The amount of the rubber selected from the group consisting of natural rubber, isoprene rubber, butadiene rubber and styrene-butadiene rubber is 45 to 75 parts by weight, and the amount of the halogenated butyl rubber is 40 to 20 parts by weight. If the amount of the rubber exceeds 75 parts by weight, the damping coefficient of the resultant rubber composition is unduly lowered so that the desired results can not be achieved. And, if the amount of the halogenated butyl rubber is less than 20 parts by weight, the damping coefficient is also excessively lowered. If the amount of the above rubber is less than 45 parts by weight, the ratio of dynamic and static spring constants becomes so high that the resultant rubber composition has poor vibration-insulating properties. And, if the amount of the halogenated butyl rubber exceeds 40 parts by weight, the ratio of dynamic and static spring constants also becomes unduly high.

In the present invention, the halogenated butyl rubber is defined to contain 1~2 mole percent of isoprene, 99~98 mole percent of isobutylene and 1.8~2.4 weight percent of halogen. It is often preferred to use brominated butyl rubber as this halogenated butyl rubber. The copolymer having the styrene content of not less than 50% is a high-styrene-content resin or a high-styrene-content SBR (styrene-butadien rubber) both of which have a styrene content of not less than 50% and are different from an ordinary styrene-butadien rubber having a styrene content of about 23%. If the amount of this copolymer is less than 5 parts by weight, the damping coefficient of the resultant rubber composition is affected by the temperature involved. Due to this temperature dependence, the damping coefficient is lowered at elevated temperatures so that the intended purpose is not achieved by the addition of the copolymer.

On the other hand, if the amount of the copolymer exceeds 15 parts by weight, the ratio of dynamic and static spring constants becomes so high that the resultant rubber composition fails to have the desired vibration-insulating properties.

In addition to the above-mentioned three components, i.e., the rubber, the halogenated butyl rubber and the copolymer having the styrene content of not less than 50%, the vibration-insulating rubber composition comprises 20 to 80 parts by weight of carbon black and 3 to 25 parts by weight of aromatic process oil both of which are based on 100 parts by weight of the total of the above rubber, halogenated butyl rubber and copolymer. If the amount of the carbon black is less than 20 parts by weight, the damping coefficient is unduly lowered. And, if the amount of the carbon black exceeds 80 parts by weight, the ratio of dynamic and static spring constants becomes unduly high. Further, if the amount of the aromatic process oil is less than 3 parts by weight, the resultant rubber composition becomes so hard that it can not be kneaded easily. If the amount of the aromatic process oil exceeds 25 parts by weight, the resultant rubber composition becomes so sticky that it tends to adhere to rolls and the like during a processing operation. Thus, the aromatic process oil must be added in the above optimum amount so as not to adversely affect the operating efficiency.

Additives commonly used in the rubber industry, such as a vulcanizing agent, a vulcanizing accelerator, a vulcanizing supplement accelerator and an aging-resistant agent, are added to the rubber composition of the present invention. Then, the rubber composition is vulcanized and molded into desired shapes to provide vibration-insulating parts.

The FIGURE is a graph showing a relation between a vibration transmissibility of a rubber composition and a frequency of a vibrating force.

The invention will now be illustrated by the following examples: In the examples, brominated butyl rubber used is one manufactured and sold by Polysar Limited under the tradename of X-002. A high-styrene-content resin is one having a styrene content of 65% by weight and manufactured and sold by Nikon Gosei Gomu Co., Ltd. (Japan) under the tradename of JSR 0061.

Static modulus Es, dynamic modulus Ed, a ratio of dynamic and static moduluses Ed/Es, and a damping coefficient ($l = \tan \delta$) were measured using a viscoelasticity measuring device (spectrometer) manufactured by Iwamoto Seisakusho (Japan). Es was Young's modulus at 15% elongation, and Ed/Es was measured at a frequency of 100 Hz$\pm$0.5%, and tan $\delta$ was measured using a frequency of 15 Hz$\pm$2%. The dynamic strains were decreased at the high frequency and increased at the low frequency in accordance with the conditions of the actual use of the vibration-insulating rubber composition.

EXAMPLE 1

Five kinds of rubber compositions were prepared by mixing together the components shown in Table 1 (the quantities of these components were expressed in terms of parts by weight). Five sheets were prepared respectively from these rubber compositions and were subjected to vulcanization at 141° C. for 30 minutes to form five samples 1 to 5, each sheet having a length of 15 cm, a width of 15 cm and a thickness of 2 mm. JIS hardness (Hd), static modulus (Es), a ratio (Ed/Es) of dynamic and static moduluses, and damping coefficient at temperatures of 25° C., 50° C. and 80° C. were measured in respect of the samples 1 to 5. The results obtained are also shown in Table 1 below.

TABLE 1

| | Sample | | | | |
|---|---|---|---|---|---|
| | 1 | 2 | 3 | 4 | 5 |
| NR | 65 | 60 | 58 | 65 | 65 |
| Br-IIR | 35 | 35 | 35 | 35 | 35 |
| High-styrene-content resin | 0 | 5 | 7 | 0 | 0 |
| Carbon black | 23 | 23 | 23 | 28 | 30 |
| aromatic oil | 5.0 | 5.0 | 5.0 | 5.0 | 5.0 |
| Stearic acid | 1.0 | 1.0 | 1.0 | 1.0 | 1.0 |
| Zinc white | 5.0 | 5.0 | 5.0 | 5.0 | 5.0 |
| Aging-resistant agent | 1.5 | 1.5 | 1.5 | 1.5 | 1.5 |
| Sulfur | 2.0 | 2.0 | 2.0 | 2.0 | 2.0 |
| Vulcanizing accelerator | 1.5 | 1.5 | 1.5 | 1.5 | 1.5 |
| Hd° | 39 | 40 | 41 | 40 | 41 |
| Es(Kg/cm$^2$) | 12.5 | 14.0 | 14.8 | 14.0 | 14.9 |
| Ed/Es (25° C.) | 1.10 | 1.15 | 1.21 | 1.25 | 1.35 |
| tan$\delta$ (25° C.) | 0.190 | 0.191 | 0.195 | 0.195 | 0.200 |
| tan$\delta$ (50° C.) | 0.080 | 0.090 | 0.100 | 0.085 | 0.095 |
| tan$\delta$ (80° C.) | 0.045 | 0.100 | 0.120 | 0.051 | 0.060 |

It will be seen from the data of the comparison samples 1 and 4 in Table 1 that the hardness becomes high by increasing the carbon black content. A comparison of the data of the samples 2 and 3 of the present invention with the data of the comparison samples 4 and 5 indicates that the hardness of the same level can be achieved by the addition of the high-styrene-content resin even if the carbon black content is relatively low as is the case with the comparison sample 1. Further, the samples 2 and 3 of the present invention have a low ratio of dynamic and static moduluses and their damping coefficients at 80° C. are twice the damping coefficients of the comparison samples 4 and 5, respectively. Thus, the samples 2 and 3 of the present invention exhibit marked vibration-insulating properties.

EXAMPLE 2

Four kinds of rubber compositions were prepared from the components (parts by weight) shown in Table 2, and four samples 6 to 9 were prepared according to the procedure in Example 1. The same tests as described in Example 1 were carried out in respect to the samples 6 to 9. The results obtained are also shown in Table 2.

TABLE 2

| | Sample | | | |
|---|---|---|---|---|
| | 6 | 7 | 8 | 9 |
| NR | 65 | 60 | 58 | 56 |
| Br-IIR | 35 | 35 | 35 | 35 |
| High-styrene-content resin | 0 | 5 | 7 | 9 |
| Carbon black | 30 | 25 | 23 | 20 |
| Aromatic oil | 5.0 | 5.0 | 5.0 | 5.0 |
| Stearic acid | 1.0 | 1.0 | 1.0 | 1.0 |
| Zinc white | 5.0 | 5.0 | 5.0 | 5.0 |
| Aging-resistant agent | 1.5 | 1.5 | 1.5 | 1.5 |
| Sulfur | 2.0 | 2.0 | 2.0 | 2.0 |
| Vulcanizing acceleration | 1.5 | 1.5 | 1.5 | 1.5 |
| Hd° | 40 | 40 | 40 | 40 |
| Es(Kg/cm$^2$) | 14.9 | 14.5 | 14.8 | 14.6 |
| Ed/Es (25° C.) | 1.35 | 1.25 | 1.21 | 1.20 |
| tan$\delta$ (25° C.) | 0.200 | 0.195 | 0.195 | 0.190 |
| tan$\delta$ (50° C.) | 0.095 | 0.097 | 0.100 | 0.090 |
| tan$\delta$ (80° C.) | 0.060 | 0.105 | 0.120 | 0.135 |

As is seen from Table 2, the comparison sample 6 must have a higher carbon black content to have a preselected hardness of 40° as compared with the samples 7 to 9 of the present invention. On the other hand, the more the amount of the high-styrene-content resin is, the less the carbon black content can be to achieve the preselected hardness, as seen from the samples 7 to 9 in Table 2. Further, although the comparison sample 6 has the preselected hardness, its damping coefficient (tan δ) at 80° C. is low. The sample 7 to which the high-styrene-content resin is added has the damping coefficient (tan δ) approximately twice that of the comparison sample 6 at 80° C. The sample 9 having a higher styrene resin content exhibits a more improved damping coefficient. Thus, the more the styrene copolymer content becomes, the more the damping coefficient is improved.

EXAMPLE 3

Four kinds of rubber compositions were prepared from the components (parts by weight) shown in Table 3, and four samples 10 to 13 were prepared according to the procedure in Example 1. The same tests as described in Example 1 were carried out in respect of the samples 10 to 13. The results obtained are also shown in Table 3.

TABLE 3-continued

|  | Sample | | | |
| --- | --- | --- | --- | --- |
|  | 10 | 11 | 12 | 13 |
| tanδ (80° C.) | 0.035 | 0.100 | 0.065 | 0.133 |

A comparison of the comparison samples 10 and 12 with the samples 11 and 13 of the present invention in Table 3 indicates that the addition of the high-styrene-content resin markedly increases the damping coefficient (tan δ) at 80° C. In addition, when the brominated butyl is used in a larger amount together with the high-styrene-content resin, the damping coefficient (tan δ) at 80° C. is further increased.

EXAMPLE 4

Nine kinds of rubber compositions were prepared from the components (parts by weight) shown in Table 4, and nine samples 14 to 22 were prepared according to the procedure in Example 1. The same tests as described in Example 1 were carried out in respect of the samples 14 to 22. The results obtained are also shown in Table 4.

TABLE 4

|  | Sample | | | | | | | | |
| --- | --- | --- | --- | --- | --- | --- | --- | --- | --- |
|  | 14 | 15 | 16 | 17 | 18 | 19 | 20 | 21 | 22 |
| NR | — | 45 | 38 | 45 | 38 | 58 | 58 | 56 | 56 |
| IR | 58 | — | — | — | — | — | — | — | — |
| Br-IIR | 35 | 35 | 35 | 35 | 35 | 35 | 35 | 33 | 33 |
| SBR | — | — | — | 20 | 20 | — | — | — | — |
| BR | — | 20 | 20 | — | — | — | — | — | — |
| High-styrene-content copolymer | 7 | 0 | 7 | 0 | 7 | 7 | — | 6 | 6 |
| High-styrene-content SBR | — | — | — | — | — | — | 7*1 | 5*2 | 5*3 |
| Carbon black | 23 | 30 | 23 | 31 | 23 | 23 | 23 | 23 | 23 |
| Aromatic oil | 5.0 | 5.0 | 5.0 | 5.0 | 5.0 | 5.0 | 5.0 | 5.0 | 5.0 |
| Stearic acid | 1.0 | 1.0 | 1.0 | 1.0 | 1.0 | 1.0 | 1.0 | 1.0 | 1.0 |
| Zinc white | 5.0 | 5.0 | 5.0 | 5.0 | 5.0 | 5.0 | 5.0 | 5.0 | 5.0 |
| Aging-resistant agent | 1.5 | 1.5 | 1.5 | 1.5 | 1.5 | 1.5 | 1.5 | 1.5 | 1.5 |
| Sulfur | 2.0 | 2.0 | 2.0 | 2.0 | 2.0 | 2.0 | 2.0 | 2.0 | 2.0 |
| Vulcanizing accelerator | 1.5 | 1.5 | 1.5 | 1.5 | 1.5 | 1.5 | 1.5 | 1.5 | 1.5 |
| Hd° | 40 | 40 | 40 | 40 | 40 | 41 | 41 | 40 | 40 |
| Hs(Kg/cm$^2$) | 14.0 | 14.9 | 14.3 | 14.7 | 14.3 | 14.8 | 14.3 | 14.9 | 14.0 |
| Ed/Es (25° C.) | 1.20 | 1.32 | 1.20 | 1.70 | 1.60 | 1.21 | 1.20 | 1.40 | 1.60 |
| tanδ (25° C.) | 0.191 | 0.195 | 0.191 | 0.200 | 0.185 | 0.195 | 0.193 | 0.235 | 0.255 |
| tanδ (50° C.) | 0.095 | 0.095 | 0.097 | 0.100 | 0.105 | 0.100 | 0.101 | 0.120 | 0.110 |
| tanδ (80° C.) | 0.121 | 0.050 | 0.118 | 0.052 | 0.110 | 0.120 | 0.125 | 0.117 | 0.110 |

(Note)
*1Styrene 75%, R-75
*2Styrene 65%, R-65
*3Styrene 55%, R-55

TABLE 3

|  | Sample | | | |
| --- | --- | --- | --- | --- |
|  | 10 | 11 | 12 | 13 |
| NR | 80 | 73 | 60 | 53 |
| Br-IIR | 20 | 20 | 40 | 40 |
| High-styrene-content resin | 0 | 7 | 0 | 7 |
| Carbon black | 27 | 20 | 30 | 23 |
| Aromatic oil | 5.0 | 5.0 | 5.0 | 5.0 |
| Stearic acid | 1.0 | 1.0 | 1.0 | 1.0 |
| Zinc white | 5.0 | 5.0 | 5.0 | 5.0 |
| Aging-resistant agent | 1.5 | 1.5 | 1.5 | 1.5 |
| Sulfur | 2.0 | 2.0 | 2.0 | 2.0 |
| Vulcanizing accelerator | 1.5 | 1.5 | 1.5 | 1.5 |
| Hd° | 40 | 41 | 40 | 40 |
| Es(Kg/cm$^2$) | 14.1 | 14.9 | 14.0 | 13.9 |
| Ed/Es (25° C.) | 1.05 | 1.06 | 1.45 | 1.41 |
| tanδ (25° C.) | 0.175 | 0.163 | 0.220 | 0.215 |
| tanδ (50° C.) | 0.078 | 0.090 | 0.100 | 0.120 |

The sample 14 in Table 4 is composed of the same components in the same blend ratio as the sample 3 in Example 1 except that the natural rubber (NR) is replaced by isoprene rubber (IR). The sample 14 exhibits properties analogous to those of the sample 3. The samples 15 and 16 contain butadien rubber (BR) in addition to NR. The samples 17 and 18 contain SBR in addition to NR. The results achieved by the addition of the high-styrene-content resin were examined through the comparison of these samples 15 to 18. The samples 15 to 18 exhibit the same results as is the case with the use of NR alone.

The sample 19 is identical to the sample 3 in Example 1. The sample 20 differs from the sample 19 only in that the high-styrene-content resin is replaced by high-styrene-content SBR. The samples 21 and 22 contains both high-styrene-content resin and high-styrene-content SBR. All these samples 19 to 22 have an increased damping coefficient (tan δ) at 80° C.

As described above, the vibration-insulating rubber composition of the present invention comprises at least one rubber selected from the group consisting of natural rubber, isoprene rubber, butadiene rubber and styrene-butadiene rubber; halogenated butyl rubber; a copolymer having a styrene content of not less than 50%; a predetermined amount of carbon black; and a predetermined amount of aromatic process oil. This rubber composition exhibits a high damping coefficient and a low ratio of dynamic and static moduluses at around a room temperature, while preventing an undue lowering of the damping coefficient at higher temperatures. Thus, with this rubber composition, the damping coefficient at higher temperatures is much higher than that of the conventional vibration-insulating rubber composition. Therefore, the vibration-insulating properties are markedly enhanced. This rubber composition is used for various vibration-insulating parts such as a mounting member for an automobile engine. Such a mounting member can adequately absorb the vibration generated by the engine so that the steering wheel will not be angularly moved unintentionally during the running of the automobile, thereby providing a reliable controllability.

What is claimed is:

1. A vibration-insulating rubber composition comprising:
   45 to 75 parts by weight of at least one rubber selected from the group consisting of natural rubber, isoprene rubber, butadiene rubber and styrene-butadiene rubber having a styrene content of about 23%;
   40 to 20 parts by weight of a halogenated butyl rubber;
   5 to 15 parts by weight of a copolymer having a styrene content of not less than 50%;
   20 to 80 parts by weight of carbon black, based on 100 parts by weight of the total of the above rubbers and copolymer; and
   3 to 25 parts by weight of an aromatic process oil, based on 100 parts by weight of the total of the above rubbers and copolymer.

2. A vibration-insulating rubber composition according to claim 1, in which said halogenated butyl rubber is brominated butyl rubber.

3. A vibration-insulating rubber composition according to claim 1, in which said copolymer has the maximum damping coefficient at a temperature of between about 40° C. to about 80° C.

4. A vibration-insulating rubber composition according to claim 1, in which the styrene-containing copolymer is present in an amount of about 5 to about 9 parts by weight and the rubber is present in an amount of about 51 to about 75 parts by weight.

5. A vibration-insulating rubber composition according to claim 1, in which said copolymer has a styrene content of about 55 to about 75%.

6. An automobile engine mounting made of the vibration-insulating rubber composition of claim 1.

7. A vibration-insulating rubber composition having the maximum damping coefficient and a low ratio of dynamic and static moduluses at a temperature of between about 40° C. to about 80° C., said rubber composition consisting essentially of:
   45 to 75 parts by weight of at least one rubber selected from the group consisting of natural rubber, isoprene rubber, butadiene rubber and styrene-butadiene rubber having a styrene content of about 23%;
   40 to 20 parts by weight of a halogenated butyl rubber;
   5 to 15 parts by weight of a copolymer having a styrene content of not less than 50%;
   20 to 80 parts by weight of carbon black, based on 100 parts by weight of the total of the above rubbers and copolymer; and
   3 to 25 parts by weight of an aromatic process oil, based on 100 parts by weight of the total of the above rubbers and copolymer.

8. A vibration-insulating rubber composition according to claim 7, in which said halogenated butyl rubber is brominated butyl rubber.

9. A vibration-insulating rubber composition according to claim 7, in which the styrene-containing copolymer is present in an amount of about 5 to about 9 parts by weight and the rubber is present in an amount of about 51 to about 75 parts by weight.

10. A vibration-insulating rubber composition according to claim 7, in which said copolymer has a styrene content of about 55 to about 75%.

11. An automobile engine mounting made of the vibration-insulating rubber composition of claim 7.

* * * * *